Figure 1:
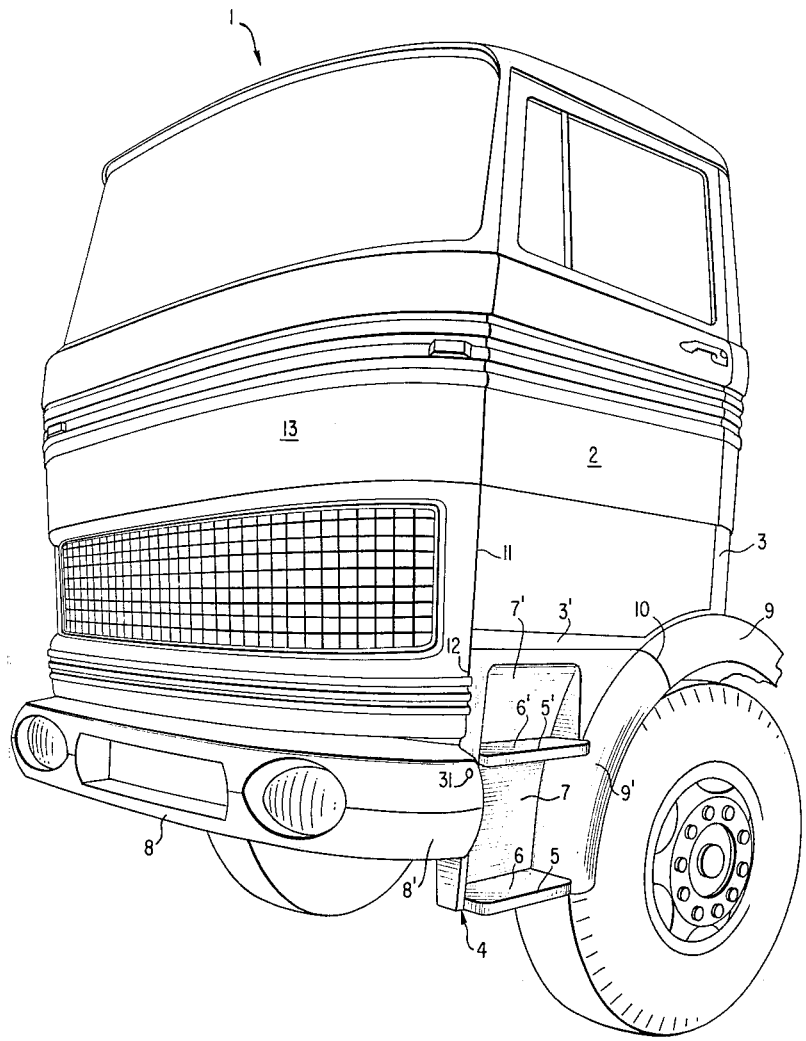

Dec. 21, 1965   H. FROITZHEIM ETAL   3,224,525
STEP UNIT FOR MOTOR VEHICLES
Filed July 8, 1963   2 Sheets-Sheet 1

INVENTORS
HANS FROITZHEIM
BY  KARL LETZEL
Dicke and Craig
ATTORNEYS

Dec. 21, 1965     H. FROITZHEIM ETAL     3,224,525
STEP UNIT FOR MOTOR VEHICLES

Filed July 8, 1963     2 Sheets-Sheet 2

INVENTORS
HANS FROITZHEIM
KARL LETZEL
BY *Dicke and Craig*
ATTORNEYS

United States Patent Office 3,224,525
Patented Dec. 21, 1965

3,224,525
STEP UNIT FOR MOTOR VEHICLES
Hans Froitzheim and Karl Letzel, Sindelfingen, Germany, assignors to Daimler-Benz Aktiengesellschaft, Stuttgart-Unterturkheim, Germany
Filed July 8, 1963, Ser. No. 293,488
Claims priority, application Germany, July 11, 1962,
D 39,349
11 Claims. (Cl. 180—89)

The present invention relates to a step or ladder arrangement for the cab or driver compartment, especially of commercial type motor vehicles, and aims above all to exploit the same for an easy accessibility of the space disposed below the cab floor and thereby to facilitate the control of the engine and to enable installation or repair of the units necessary for operation of the vehicle without great hinderance by other vehicle parts.

Known in the prior art are arrangements in which an entire side part of the vehicle cab or driver compartment without steps is adapted to be lifted outwardly and adapted to be swung about a horizontally arranged pin or about a horizontally slotted ball joint within an upright or vertical plane. The forces occurring thereby however, load and stress the side part as well as the pivot means to a large extent, and several persons are necessary for carrying out the swinging or lifting movements. Furthermore, several additional securing and fastening means are required with such prior art constructions in the normal position of the movable part.

In contradistinction thereto, the present invention essentially consists in that the steps for the driver compartment or cab are constructed as hinged cover for a space accessible by lifting the cover and containing the engine or other units necessary for operation of the vehicle. Preferably, the cover according to the present invention is for that purpose adapted to be lifted up or pivoted about an upper horizontal axis.

Since the steps require anyhow a strong reinforcement for the absorption of the loads, the step construction is particularly suitable for use as a pivotal, cover-like side part and enables a stable and reliable pivotal support thereof. Simultaneously therewith, the steps are arranged at a place particularly suitable for the accessibility to the engine space or to the space below the driver cab or driver seat utilized for possibly other purposes. In the lifted up condition, the step arrangement in accordance with the present invention leaves open an aperture which enables the required freedom of movement of a person with respect to height and width thereof.

The steps according to the present invention are preferably arranged below the longitudinal bearer of the vehicle body, between a forward bumper and the side fender of the front wheel, whereby they include simultaneously a part of the fender. A particularly advantageous construction of the present invention further consists in that the steps are, for purposes of lifting the same out of the body, supported adapted to be pulled out, for example, at a telescopic framework. The step construction according to the present invention, notwithstanding its recessed arrangement in the side wall and the inclusion of a part of the laterally projecting fender into the pivotal unit of the step construction, may be lifted up without difficulty through 180° and therebeyond into a stable position thereof which is as little disturbing as possible.

Accordingly, it is an object of the present invention to provide a step arrangement for the driver cab of a motor vehicle, especially of commercial type motor vehicles, which is simple in construction and avoids the drawbacks encountered with the prior art constructions.

It is another object of the present invention to provide a step arrangement for the driver compartment of a motor vehicle which assures good accessibility to the space located below the floor of the driver compartment and which is so constructed and arranged as not to require structural parts that impair the accessibility.

Still a further object of the present invention resides in a pivot step construction for the cab of a motor vehicle which may be readily pivoted, is of relatively lightweight construction notwithstanding its sturdiness, and is capable of absorbing all loads expected thereof without causing excessive stresses within adjoining body parts.

A further object of the present invention resides in the provision of a cover-like step construction for the cab of a motor vehicle which may be swung through more than 180° to be lifted into an upright position that is stable and as little disturbing as possible.

A further object of the present invention resides in the provision of a unitary step construction for the cab of a vehicle which includes part of the fender, is mounted in an extremely simple manner at the vehicle frame yet permits a simple actuation thereof without requiring complicated and expensive pivotal support structures.

Figure 2:
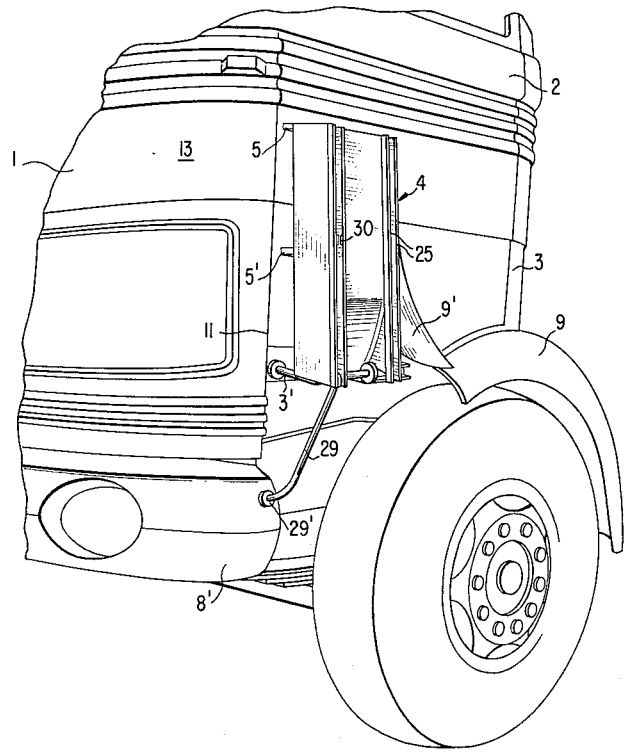
Figure 3:
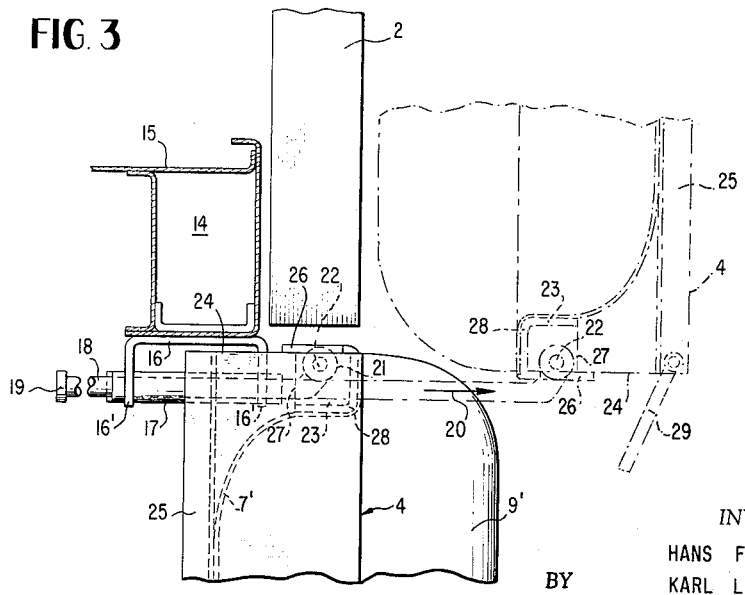

These and other objects, features and advantages of the present invention will become more obvious from the following description when taken in connection with the accompanying drawing which shows, for purposes of illustration only, one embodiment in accordance with the present invention, and wherein:

FIGURE 1 is a partial view of the driver cab of a commercial type vehicle as viewed laterally from in front thereof and with the step construction according to the present invention in the normal position thereof, FIGURE 2 is a partial perspective view, similar to FIGURE 1 of a driver cab in accordance with the present invention with the step unit lifted up, and FIGURE 3 is an elevational view viewed from in front of the vehicle with parts in cross section, of the arrangement of the pivot joint for the step construction in accordance with the present invention whereby the step arrangement is shown in the normal position thereof in full line and in the lifted up position in dot and dash lines.

Referring now to the drawing wherein like reference numerals are used throughout the various views to designate like parts, reference numeral 1 generally designates therein a driver cab of a modern commercial type vehicle shown only in parts. The outer body panels of the door 2 of the driver cab 1 are flush with the side walls 3 of the driver cab 1 which is accessible to the driver from the outside by way of the step unit generally designated by reference numeral 4. The outer edges of the step unit 4, and more particularly of the step plates 5 and 5' of the two steps 6 and 6' are disposed approximately flush with the side wall panels of the driver cab 1 or project therebeyond only by a slight amount. The steps 6 and 6' thereby form the bottom parts of step recesses 7 and 7' of the step unit which extends between the ends 8' of the forward bumper 8 and the forwardly disposed part 9' of the forward fender 9 whereby the bumper 8 terminates approximately within the plane of the outer edge of the fender 9.

The step unit 4 which forms a part of the lower side walls of the body of the driver cab is, as shown particularly in FIGURE 2, pivotally arranged at the height of the lower edge 3' of the driver cab 1 to enable it to be lifted up. For this purpose the fender 9 is provided with a transversely extending partial gap 10 at the height of the lower edge 3' of the floor; the door joint 11 is also extended a slight distance 12 approximately up to the bumper 8 whereby the side wall 3 is separated from the bottom up to the roof thereof in a continuous manner from the front wall 13 of the driver cab 1.

The bottom 15 of the driver cab 1 which is laterally reinforced by a longitudinal bearer of approximately box-shaped cross section, is placed, as shown in FIGURE 3, by means of the longitudinal bearer 14 on a rail 16 of U-shaped cross section and extending like the longitudinal bearer in the longitudinal direction. The driver cab floor 15 is securely connected in any suitable manner with the longitudinal bearer 14 and the latter with the rail 16. The rail 16 is open toward the bottom thereof. Two relatively short tubular members or pipes 17 extend through the two lateral leg portions 16' of the rail 16 disposed at a slight distance from one another, and the tubular members 17 are suitably secured for example, welded to the leg portions 16'. Two further tubular members 18 are displaceably supported within the horizontally disposed tubular members 17. The further tubular members 18 are adapted to be pulled out in the direction of arrow 20 at the forward parts thereof in the outward direction until the abutments 19 thereof abut against the inner ends of the tubular members 17. In order to hold the telescopically arranged tubular members 18 in the fully pulled-out and fully pushed-in positions thereof, any suitable detent means of conventional construction (not shown herein) may be provided which, for example, by snap action of elastically movable cams engaging in notches or detents of the pipes 18 or the like may be held in the respective positions. Since such detent arrangements are known per se in the prior art and form no part of the present invention, a detailed showing thereof is dispensed with herein.

The inner tubular members 18 are provided with upwardly bent ends formed into eye portions or bearing bosses 21, which, in turn, are provided with oppositely directed bearing pins 22 projecting therefrom. The bearing pins 22 are pivotally supported within a bearing rail 23 of approximately U-shaped construction which is open toward the inside. The rail 23 is inserted at the upper rim of the step unit 4 between two reinforcing rails 25 thereof which extend inwardly, on the backside of the step recesses 7 and 7' over the entire height of the unit in proximity to the longitudinal edges thereof.

The rail 23 is provided, at the height of each eye portion or boss 21, either at both leg portions thereof or only at the upper leg portion thereof with approximately rectangular apertures 26. These apertures 26 are reinforced by the insertion of lateral partition walls 27 into open box-shaped bearing members 28 in which are rotatably supported the eye portions 21 provided at the outer ends of the inner tubular members 18 by means of the pins 22 thereof.

Since the step unit 4 includes the forward part 9' of the fender 9 there is produced by a pivotal movement about the axis of rotation arranged along the floor 15 of the driver cab 1 and determined by the pins 22 a sufficiently large opening area when the axis of rotation is located within the plane of the outer edge of the floor 15 of the cab 1. In order that the step unit 4 and the movable parts thereof free the access as much as possible and without hindrance, the step unit 4 is pulled out in the transverse direction by means of the tubular members 18 telescopically supported within the tubular members 17. As a result thereof, the step unit 4 may be lifted up in excess of 180° without requiring a complicated pivotal connection.

The requisite securing of the cover forming the step unit in the lifted up position is attained by means of a rod 29 (FIGURE 2). The rod 29 is secured pivotally at the step unit 4 at one end thereof, preferably at the inner edge thereof, and during non-use is stored within and retained on the other end 29' thereof at the step unit 4 by means of a spring clamp in the manner of a so-called lyre spring 30. The lyre spring 30 is secured at one of the reinforcing rails 25 of the liftable step unit 4.

During lifting, the step unit 4 is swung in the upward direction through a 180° angle so that the outer edges 5 and 5' of the steps 6 and 6' thereof abut against the outer sheet metal panels of the door 2. The upward position of the step unit 4 is secured by means of the rod 29 which is now disengaged at 30 and swung downwardly whereby the free end 29' thereof is inserted into an insertion aperture 31 provided at the outer end 8' of the bumper and is tightened thereat manually in any conventional manner.

Of course, the step unit must be locked during the drive against vibrations and rattles; for that purpose any readily detachable means of conventional construction may be used which form no part of the present invention and therefore are not shown in detail herein. Similarly, instead of the displaceable arrangement of the pivot pin 22, the guide hinges may be installed with pivot points movable on a cam plate; however, such a construction, as a rule, is relatively expensive and leads to an operationally less reliable construction.

It is further possible without difficulty to arrange the step unit 4 in a detachable manner, for example, by detachable fastening means of the abutments 19 of the tubular members 18. In case the tubular members 18 are pulled out completely, the step unit 4 pivotally secured thereat would be disengaged from the floor structure 14, 15 of the driver cab 1.

The pulling out as well as the lifting of the step unit 4 may also take place by arrangements including conventional electric, pneumatic and/or hydraulic drives or combination thereof producing a far-reachingly automatic actuation.

The displaceable tubular framework 17, 18 which as a rule is necessary with very wide fenders projecting somewhat beyond the normal contour of the vehicle body, may be dispensed with in case of a driver cab of which the side walls extend flush with the door and fender in that, for example, the joint or pivot bearing is arranged at a rigid support pipe or the like.

In order to achieve a soft abutment when lifting up the step unit and to prevent damage to the vehicle outer body panels, the outer edges of the step plates 5 and 5' are preferably covered with a ledge made of absorbing material.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A step unit for the cab of a motor vehicle, especially of a commercial type motor vehicle, comprising:
    step means constructed as a liftable cover for a space below the drive compartment in the cab which space is rendered accessible by lifting up said cover and contains units necessary for operation of the vehicle, said cab being provided with outer body side panels, and said step means being provided with recessed steps and arranged substantially flush with said side panels, and pivot means having a horizontal axis for pivotally supporting said liftable cover, said cover being movable about said horizontal axis from a position in which said cover extends downwardly from said axis to an upward position in which said space is rendered accessible.

2. A step unit for the cab of a motor vehicle, especially of a commercial type motor vehicle, comprising:
    step means constructed as a liftable cover for a space below the drive compartment in the cab which space is rendered accessible by lifting up said cover and contains units necessary for operation of the vehicle, and means pivotally supporting said step means about an upper horizontal axis to enable swinging of said cover through an angle of at least about 180°, said cab being provided with outer body side panels, and said step means being provided with recessed steps and arranged substantially flush with said side panels, said vehicle including a fender, and said step means forming part of said fender.

3. A step unit for the cab of a motor vehicle, especially of a commercial type motor vehicle, comprising:

step means constructed as a liftable cover for a space below the driver compartment in the cab which space is rendered accessible by lifting up said cover and contains units necessary for operation of the vehicle, and means enabling said step means to be pulled out of the vehicle body for purposes of lifting said step means, said last-mentioned means including a tubular framework, and said step means being pivotally secured at said tubular framework, said tubular framework including substantially horizontally disposed transversely extending tubular members, further tubular members telescopically arranged within said first-mentioned tubular members, said further tubular members being provided at the outer ends thereof with bearing eyes, and means including rail means operatively connecting the side portions of the steps for pivotally securing said step means at said bearing eyes.

4. A step unit for the cab of a motor vehicle, especially of a commercial type motor vehicle, comprising:

step means constructed as a liftable cover for a space below the driver compartment in the cab which space is rendered accessible by lifting up said cover and contains units necessary for operation of the vehicle, means pivotally supporting said step means about an upper horizontal axis to enable swinging of said cover through an angle of at least about 180°, said cab being provided with outer body side panels, and said step means being provided with recessed steps and arranged substantially flush with said side wall panels, said vehicle including a fender, and said step means forming part of said fender, said vehicle including longitudinal bearer means, a front bumper and a fender for the front, and said step means being disposed between said bumper and said front fender below said longitudinal bearer means, and means enabling said step means to be pulled out of the vehicle body for purposes of lifting said step means, said last-mentioned means including a tubular framework secured at said longitudinal bearer means, and said step means being pivotally secured at said tubular framework, said tubular framework including substantially horizontally disposed transversely extending tubular members, further tubular members telescopically arranged within said first-mentioned tubular members, said further tubular members being provided at the outer ends thereof with bearing eyes, and means including rail means operatively connecting the side portions of the steps for pivotally securing said step means at said bearing eyes.

5. A step unit for the cab of a motor vehicle, especially of a commercial type motor vehicle, comprising:

step means constructed as a liftable cover for a space below the driver compartment in the cab which space is rendered accessible by lifting up said cover and contains units necessary for operation of the vehicle, means pivotally supporting said step means about an upper horizontal axis to enable swinging of said cover through an angle of at least about 180°, said cab being provided with outer body side panels, and said step means being provided with recessed steps and arranged substantially flush with said side wall panels, said vehicle including a fender, and said step means forming part of said fender, and said vehicle including longitudinal bearer means, a front bumper and a fender for the front wheel, and said step means being disposed between said bumper and said front fender below said longitudinal bearer means.

6. A step unit for the cab of a motor vehicle, especially of a commercial type motor vehicle, comprising:

step means constructed as a liftable cover for a space below the driver compartment in the cab which space is rendered accessible by lifting up said cover and contains units necessary for operation of the vehicle, means pivotally supporting said step means about an upper horizontal axis to enable swinging of said cover through an angle of at least about 180°, said cab being provided with outer body side panels, and said step means being provided with recessed steps and arranged substantially flush with said side wall panels, said vehicle including a fender, and said step means forming part of said fender, said vehicle including longitudinal bearer means, a front bumper and a fender for the front, and said step means being disposed between said bumper and said front fender below said longitudinal bearer means, and means enabling said step means to be pulled out of the vehicle body for purposes of lifting said step means, said last-mentioned means including a tubular framework secured at said longitudinal bearer means, and said step means being pivotally secured at said tubular framework, said tubular framework including substantially horizontally disposed tranversely extending tubular members, further tubular members telescopically arranged within said first-mentioned tubular members, said further tubular members being provided at the outer ends thereof with bearing eyes, and means including rail means operatively connecting the side portions of the steps for pivotally securing said step means at said bearing eyes, and means for securing the step means in the lifted-up position including an aperture provided in the vehicle body and a support rod pivotally supported on the backside of said step means and adapted to be inserted into said aperture.

7. In a motor vehicle, especially in a commercial type motor vehicle provided with a driver cab forming a driver compartment by lateral and transversely extending body panels, which driver compartment is limited by a floor supported by a longitudinal bearer structure, and in which steps are provided along the sides of the vehicle to enable the driver to mount into the compartment of the cab, the improvement essentially consisting of constructing the steps as a unitary cover member swingable to a position which renders accessible the space below the floor, and means for pivotally securing said unitary cover structure adjacent the floor of said cab and along the upper edge of said cover structure about an approximately horizontal axis to enable pivoting of the unitary cover structure through an angle of about 180° from a position impeding access to said space to said first-named position, the steps in said unitary cover structure being arranged recessed in such a manner that the outer edges thereof are about flush with the side panels of the vehicle body of the cab.

8. In a motor vehicle, especially in a commercial type motor vehicle provided with a driver cab forming a driver compartment by lateral and transversely extending body panels, which driver compartment is limited by a floor supported by a longitudinal bearer structure, and in which steps are provided along the sides of the vehicle to enable the driver to mount into the compartment of the cab, the improvement essentially consisting of constructing the steps as a swingable unitary cover member which renders accessible the space below the floor by lifting up said unitary cover structure, the steps in said unitary cover structure being arranged recessed in such a manner that the outer edges thereof are about flush with the side panels of the vehicle body of the cab, said unitary cover structure including a portion of the fender, and being arranged between the front bumper and the fender of the front wheel below the longitudinal bearer structure.

9. In a motor vehicle, especially in a commercial type motor vehicle provided with a driver cab forming a driver compartment by lateral and transversely extending body panels which driver compartment is limited by a floor supported by a longitudinal bearer structure, and in which steps are provided along the sides of the vehicle to enable the driver to mount into the compartment of the cab, the improvement essentially consisting of constructing the steps as a liftable unitary cover member which renders accessible the space below the floor by lifting up said unitary cover structure, said pivotal connecting means including means to enable said unitary cover structure to be pulled out of the vehicle body for purposes of lifting the same, said last-mentioned means including telescopic parts provided with bearing eyes at the outer ends thereof, pin means in said bearing eyes, and rail means reinforcing said unitary cover structure, said pins engaging with said rail means to achieve the pivotal support.

10. A step unit for the cab of a motor vehicle, especially of a commercial type motor vehicle, comprising:

step means constructed as a liftable cover for a space below the driver compartment in the cab which space is rendered accessible by lifting up said cover and contains units necessary for operation of the vehicle, means pivotally supporting said step means about an axis to enable swinging of said cover through an angle of at least about 180°, and means for securing the step means in the lifted-up position including an aperture provided in a fixed part of the vehicle and a securing rod pivotally supported on the backside of said step means and adapted to be inserted into said aperture.

11. A step unit for the cab of a motor vehicle, especially of a commercial type motor vehicle having side walls, said unit comprising:

step means constructed as a liftable cover for a space below the driving compartment in the cab which space is rendered accessible by lifting up said cover and contains units necessary for the operation of the vehicle, said step unit comprising wall means comprising marginal portions forming a continuation of one of said side walls and being substantially coplanar therewith, said step unit further comprising recessed step structure disposed substantially perpendicular to the plane of said one of said side walls and said marginal portions, and means pivotally supporting said step structure about an upper horizontal axis disposed rearwardly of said marginal portions to enable swinging of said step structure upwardly from a recessed position in which said space is closed by said cover to a raised position in which said space is rendered accessible.

References Cited by the Examiner
UNITED STATES PATENTS

| | | |
|---|---|---|
| 1,795,208 | 3/1931 | Garner. |
| 1,877,152 | 9/1932 | Vogel _____ 280—166 |
| 2,146,668 | 2/1939 | Baade. |
| 2,453,937 | 11/1948 | Ray _____ 280—164 X |
| 2,781,102 | 2/1957 | Prichard _____ 180—89 |

A. HARRY LEVY, *Primary Examiner.*